United States Patent
Miki

(10) Patent No.: US 11,104,376 B1
(45) Date of Patent: Aug. 31, 2021

(54) POWER SUPPLY CURRENT CONTROL DEVICE, ELECTRIC ACTUATOR PRODUCT, AND ELECTRIC POWER STEERING DEVICE

(71) Applicant: NSK LTD., Tokyo (JP)

(72) Inventor: Yasutoshi Miki, Maebashi (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 17/260,735

(22) PCT Filed: Feb. 7, 2020

(86) PCT No.: PCT/JP2020/004903
§ 371 (c)(1),
(2) Date: Jan. 15, 2021

(87) PCT Pub. No.: WO2020/166519
PCT Pub. Date: Aug. 20, 2020

(30) Foreign Application Priority Data

Feb. 13, 2019 (JP) .............................. JP2019-023750

(51) Int. Cl.
*H02M 1/32* (2007.01)
*H02M 7/5387* (2007.01)
(Continued)

(52) U.S. Cl.
CPC ........ *B62D 5/0463* (2013.01); *H02M 1/0009* (2021.05); *H02M 1/32* (2013.01); *H02M 7/5387* (2013.01); *H02P 27/06* (2013.01)

(58) Field of Classification Search
CPC .... B62D 5/0463; H02M 1/0009; H02M 1/32; H02M 7/5387; H02P 27/06
(Continued)

(56) References Cited

U.S. PATENT DOCUMENTS 10,594,145 B1 * 3/2020 Wang .................... H02J 7/0048
10,884,475 B1 * 1/2021 Wang .................... G01R 31/367
(Continued)

FOREIGN PATENT DOCUMENTS

JP 2002-002514 A 1/2002
JP 4352268 B2 10/2009
(Continued)

OTHER PUBLICATIONS

International Search Report for PCT/JP2020/004903 dated Apr. 7, 2020 [PCT/ISA/210].
(Continued)

*Primary Examiner* — Jorge L Carrasquillo
(74) *Attorney, Agent, or Firm* — Sughrue Mion, PLLC

(57) ABSTRACT

A power supply current control device including: a current limit value calculation unit configured to calculate a current limit value on a basis of a difference between a power supply voltage and a predetermined set voltage, a power supply current, and a resistance model representing a resistance component of the power supply circuit; a power supply current limit unit configured to limit a magnitude of the power supply current on a basis of the current limit value; a change rate limit value calculation unit configured to calculate a change rate limit value on a basis of the difference and a change speed of the power supply voltage; and a power supply current change rate limit unit configured to limit a change rate of the power supply current on a basis of the change rate limit value.

10 Claims, 11 Drawing Sheets

(51) Int. Cl.
*H02P 27/06* (2006.01)
*B62D 5/04* (2006.01)
*H02M 1/00* (2006.01)

(58) Field of Classification Search
USPC .......................................................... 318/139
See application file for complete search history.

(56) References Cited

U.S. PATENT DOCUMENTS

| | | | |
|---|---|---|---|
| 2001/0053952 | A1 | 12/2001 | Kodaka et al. |
| 2005/0041446 | A1* | 2/2005 | Harnett .................. H02M 1/32 363/95 |
| 2008/0157539 | A1* | 7/2008 | Tani .......................... H02J 1/14 290/40 C |
| 2010/0044146 | A1 | 2/2010 | Kasai et al. |
| 2011/0161025 | A1* | 6/2011 | Tomura ................ H01M 10/48 702/63 |
| 2013/0193881 | A1* | 8/2013 | Muto .................... B25B 23/141 318/139 |
| 2018/0029635 | A1 | 2/2018 | Kuroda et al. |
| 2018/0091081 | A1 | 3/2018 | Suzuki et al. |

FOREIGN PATENT DOCUMENTS

| | | |
|---|---|---|
| JP | 2018-016172 A | 2/2018 |
| JP | 2018-057166 A | 4/2018 |

OTHER PUBLICATIONS

Written Opinion for PCT/JP2020/004903 dated Apr. 7, 2020 [PCT/ISA/237].

* cited by examiner

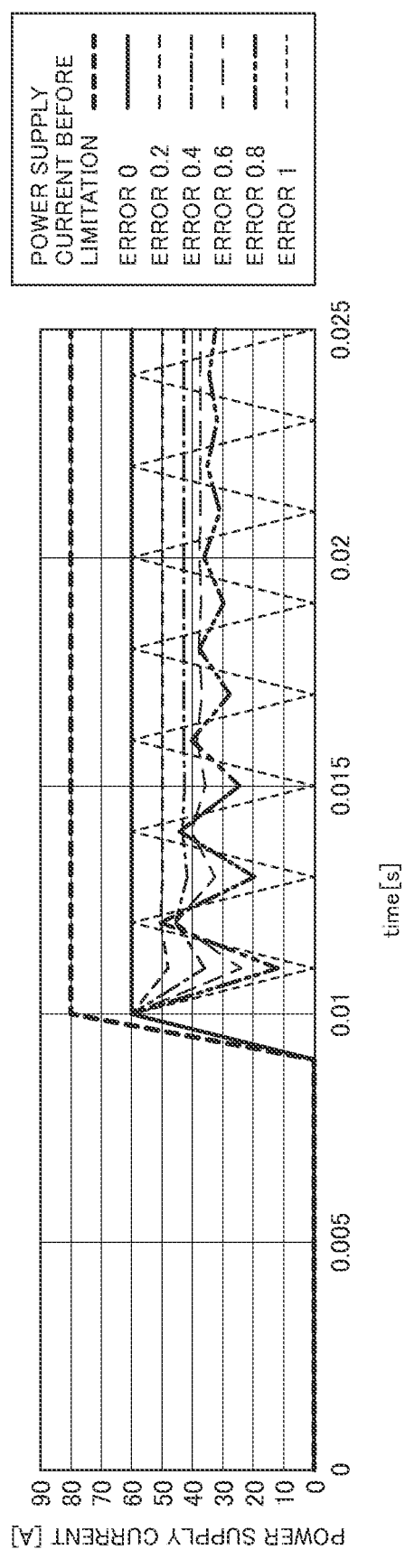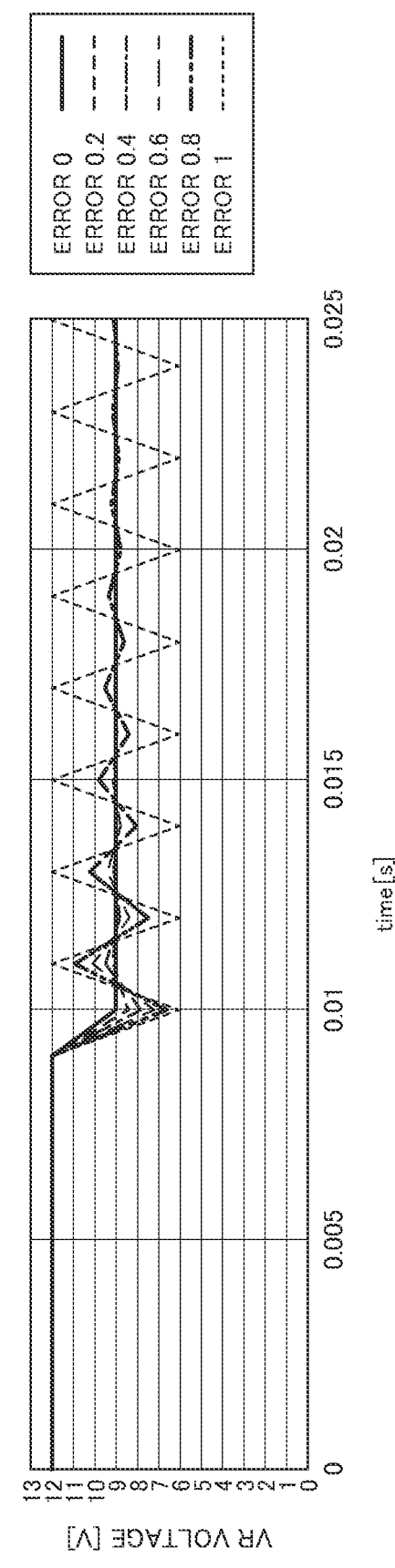

POWER SUPPLY CURRENT CONTROL DEVICE, ELECTRIC ACTUATOR PRODUCT, AND ELECTRIC POWER STEERING DEVICE

CROSS REFERENCE TO RELATED APPLICATIONS

This application is a National Stage of International Application No. PCT/JP2020/004903 filed Feb. 7, 2020, claiming priority based on Japanese Patent Application No. 2019-023750 filed Feb. 13, 2019.

TECHNICAL FIELD

The present invention relates to a power supply current control device configured to limit a power supply current supplied from a power supply circuit to a load, and an electric actuator product and an electric power steering device using the same.

BACKGROUND ART

A technology has been proposed to limit a power supply current so that a power supply voltage supplied to a load does not drop below a predetermined lower limit value.

For example, when supplying power to a load such as an electric power steering device, application of a steering assistance force is stopped if the power supply voltage drops below the lower limit value due to increased power consumption. Therefore, when the power supply voltage drops, it is necessary to suppress power consumption so as not to result in stop of the steering assistance force even if the steering assistance force is reduced.

Accordingly, an electric power steering device described in PTL 1 below determines an upper limit current value of a power supply current according to a proportional component and a differential component of a deviation between a power supply voltage and a set voltage, and performs feedback control so that the power supply voltage becomes the set voltage.

CITATION LIST

Patent Literature

PTL 1: JP Pat. No. 4352268

SUMMARY OF INVENTION

Technical Problem

However, when the upper limit current value that limits the power supply current is set solely on the basis of the power supply voltage, the upper limit current value may be excessively small or excessively large.

For example, when a maximum allowable current allowed by a system is already flowing and therefore the power supply voltage is approaching a lower limit value, there is little need to set the upper limit current value lower than the maximum allowable current. On the other hand, when the power supply voltage drops even though not much power supply current is flowing, it is necessary to set a lower upper limit current value to strongly limit the power supply current.

In this case, if the upper limit current value is simply lowered in response to the power supply voltage drop, the upper limit current value may become excessively small or excessively large.

The present invention has been made in view of the above problem, and it is an object of the present invention to, when limiting power supply current by an upper limit current value to mitigate power supply voltage drop, suppress the upper limit current value from being set excessively small or excessively large.

Solution to Problem

To achieve the above object, a power supply current control device according to one aspect of the present invention includes a voltage detecting means configured to detect a power supply voltage applied from a power supply circuit, a current detecting means configured to detect a power supply current supplied from the power supply circuit, a current limit value calculation unit configured to calculate a current limit value on the basis of a difference between the power supply voltage detected by the voltage detecting means and a predetermined set voltage, the power supply current detected by the current detecting means, and a resistance model representing a resistance component of the power supply circuit, and a power supply current limit unit configured to limit a magnitude of the power supply current on the basis of the current limit value.

As described above, calculating the current limit value on the basis of not only the power supply voltage but also a detected value of the power supply current and the resistance model of the power supply circuit can suppress the current limit value from being set excessively small or excessively large.

Note that when the current limit value is calculated on the basis of the resistance model representing the resistance component of the power supply circuit, the current limit value is affected by an error between an actual resistance value of the power supply circuit and the resistance model. Additionally, the actual resistance value of the power supply circuit can easily fluctuate.

For example, when a battery is used as a power supply, the resistance value of the power supply circuit fluctuates due to deterioration over time, connector contact resistance, harness deterioration, temperature rise, or the like.

Additionally, for example, in the case of an electric power steering device, if a battery terminal is dropped off and the electric power steering device is directly connected to a generator, power supply voltage easily drops due to increased power supply current, so that an internal resistance of the power supply circuit viewed from the electric power steering device appears to have increased.

The error that occurs between the actual resistance value of the power supply circuit and the resistance model used to calculate the current limit value causes a state where the power supply current is excessively limited by the current limit value, whereby the power supply current and the power supply voltage may become unstable.

Furthermore, in the case of an electric power steering device, a sudden decrease in the steering assistance force due to a sudden decrease in the power supply current reduces the feeling of steering. Therefore, it is preferable to gently limit the power supply current.

Thus, the power supply current control device according to the one aspect of the present invention includes a change rate limit value calculation unit configured to calculate a change rate limit value on the basis of the difference between the power supply voltage detected by the voltage detecting means and the predetermined set voltage and a change speed of the power supply voltage and a power supply current change rate limit unit configured to limit a change rate of the power supply current on the basis of the change rate limit value.

By limiting the change rate of the power supply current on the basis of the change speed of the power supply voltage that fluctuates depending on the actual resistance value of the power supply circuit, it is possible to suppress the power supply current and the power supply voltage from becoming unstable even when an error occurs between the actual resistance value and the resistance model.

Additionally, limiting the change rate of the power supply current enables a gentle start of limitation on steering assistance force in the case of an electric power steering device.

According to another aspect of the present invention, there is provided an electric actuator product including the above-described power supply current control device and a motor driven by the power supply current controlled by the power supply current control device.

According to still another aspect of the present invention, there is provided an electric power steering device that applies a steering assistance force to a steering system of a vehicle by the above-described electric actuator product.

Advantageous Effects of Invention

According to the present invention, it is possible to, when limiting power supply current by an upper limit current value to mitigate power supply voltage drop, suppress the upper limit current value from being set excessively small or excessively large.

BRIEF DESCRIPTION OF DRAWINGS

FIGS. 5A and 5B are time charts illustrating simulation results of a power supply current and a power supply voltage when current power supply is limited by a power supply current limit unit;

DESCRIPTION OF EMBODIMENTS

Embodiments of the present invention will be described in detail with reference to the drawings.

It should be noted that the embodiments given below are those exemplifying devices and methods for embodying the technological ideas of the present invention, and the technological ideas of the present invention do not limit the structures, arrangement, and the like of components to those described below. The technological ideas of the present invention can be variously modified within the technological scope defined by the claims described in CLAIMS.

Hereinafter, there will be described an example in which a power supply current control device of the present invention is applied to an electric power steering device. However, the present invention is not limited thereto, and is applicable to various electric devices using a power supply. For example, the power supply current control device of the present invention is applied to an electric actuator product including a motor driven by power supply current, and can be used to control the power supply current that drives the motor.

First Embodiment (Structure)

Figure 1:
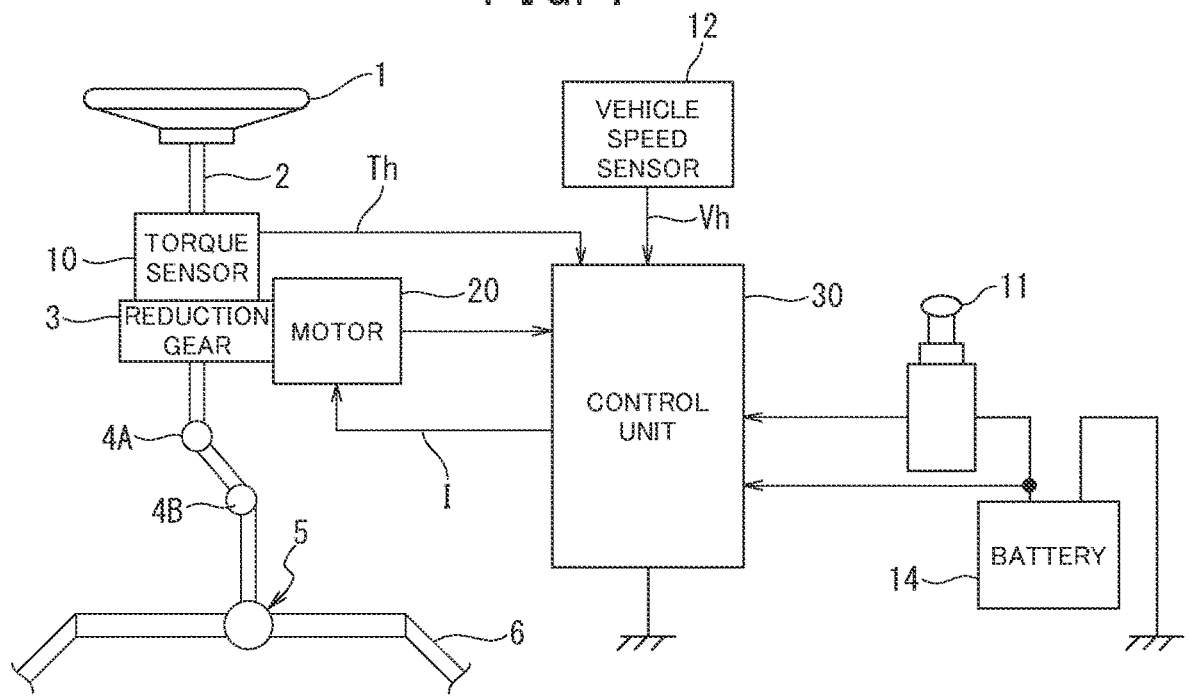
FIG. 1 is a structural diagram illustrating an outline of an example of an electric power steering device of an embodiment.

FIG. 1 illustrates a structural example of an electric power steering device of an embodiment. A steering shaft (column shaft or steering wheel shaft) 2 of a steering wheel 1 is connected to tie rods 6 of steered wheels through a reduction gear 3, universal joints 4A and 4B, and a pinion rack mechanism 5. The steering shaft 2 is provided with a torque sensor 10 that detects a steering torque Th of the steering wheel 1, and a motor 20 that assists steering force of the steering wheel 1 is connected to the steering shaft 2 via the reduction gear 3.

Electric power from a battery 14 that is a power supply is supplied to a control unit (ECU) 30 that controls the electric power steering device, and also an ignition key signal is input to the control unit 30 from an ignition key 11. The control unit 30 calculates a steering assistance command value of an assist command using an assist map or the like on the basis of the steering torque Th detected by the torque sensor 10 and a vehicle speed Vh detected by a vehicle speed sensor 12, and controls a current I that is supplied to the motor 20 on the basis of the calculated steering assistance command value.

In the electric power steering device having such a structure, the torque sensor 10 detects the steering torque Th by a driver's steering wheel operation transmitted from the steering wheel 1, and the motor 20 is driven and controlled by the steering assistance command value calculated on the basis of the detected steering torque Th and the vehicle speed Vh. The drive is applied as an assistance force (steering assistance force) for the driver's steering wheel operation to a steering system, so that the driver can operate the steering wheel with light force. In other words, the steering assistance command value is calculated by the steering torque Th output by the steering wheel operation and the vehicle speed Vh, and depending on how the motor 20 is controlled on the basis of the steering assistance command value, it is determined whether the steering wheel operation feels good or bad, and performance of the electric power steering device is greatly influenced.

The control unit 30 may include, for example, a computer including a processor and peripheral components such as a storage device. The processor may be, for example, a central processing unit (CPU) or a micro-processing unit (MPU).

The storage device may include any of a semiconductor storage device, a magnetic storage device, and an optical storage device. The storage device may include memories, such as register, cache memory, and read only memory (ROM) and random access memory (RAM) used as primary storage.

Note that the control unit 30 may be formed by dedicated hardware for executing each information processing that will be described below.

For example, the control unit 30 may include a functional logic circuit set in a general-purpose semiconductor integrated circuit. For example, the control unit 30 may include a programmable logic device (PLD) such as a field-programmable gate array (FPGA), or the like.

An example of a functional structure of the control unit 30 of the embodiment will be described with reference to FIG. 2. The control unit 30 includes a basic current command value calculation unit 31, a motor control unit 32, a current limit unit 33, and a motor drive circuit 34.

Functions of the basic current command value calculation unit 31, the motor control unit 32, and the current limit unit 33 are realized by, for example, causing the processor of the control unit 30 to execute a computer program stored in the storage device.

Additionally, the motor drive circuit 34 may be, for example, an inverter having a bridge structure in which each of an upper arm and a lower arm is formed by a switching element such as a field effect transistor (FET).

The basic current command value calculation unit 31 calculates an assist current for energizing the motor 20 using the assist map or the like on the basis of the steering torque Th detected by the torque sensor 10 and the vehicle speed Vh detected by the vehicle speed sensor 12, and calculates a current command value that is a control target value of the assist current.

The motor control unit 32 generates a control signal of the motor drive circuit 34 so as to cause the assist current calculated by the basic current command value calculation unit 31 to flow to the motor 20.

A power supply voltage VR is applied to the motor drive circuit 34 by the battery 14, and a power supply current Ibat is supplied thereto from the batter 14. A voltage sensor 35 serving as a voltage detecting means detects an applied voltage applied to the motor drive circuit 34 as the power supply voltage VR. A current sensor 36 serving as a current detecting means detects the power supply current Ibat flowing to the motor drive circuit 34. The power supply current Ibat supplied to the motor drive circuit 34 is on-off controlled by the control signal generated by the motor control unit 32, and supplied to the motor 20 as the assist current.

The current limit unit 33 controls the power supply current supplied to the motor drive circuit 34 from the battery 14 on the basis of the power supply voltage VR detected by the voltage sensor 35 and the power supply current Ibat detected by the current sensor 36. Hereinbelow, the power supply voltage VR detected by the voltage sensor 35 may be referred to as "detected value of the power supply voltage VR", and the power supply current Ibat detected by the current sensor 36 may be referred to as "detected value of the power supply current Ibat".

An example of a functional structure of the current limit unit 33 of a first embodiment will be described with reference to FIG. 3. The current limit unit 33 includes a subtractor 40, a current limit value calculation unit 41, and a power supply current limit unit 42.

The subtractor 40 calculates a difference (VR−VLo) obtained by subtracting a predetermined lower limit voltage VLo from a detected value of the power supply voltage VR. The lower limit voltage VLo may be, for example, a voltage obtained by adding a predetermined margin to a minimum value of a voltage applied to the motor drive circuit 34 allowed by the electric power steering device.

The lower limit voltage VLo is set by CAN transmission from a vehicle-side control unit that performs power supply management or set in the control unit 30.

The current limit value calculation unit 41 calculates a current limit value IbatMAX that limits an upper limit of the power supply current Ibat flowing through the motor drive circuit 34 on the basis of the difference (VR−VLo), the detected value of the power supply current Ibat, and a resistance model representing a resistance component of a power supply circuit that supplies the power supply voltage VR to the motor drive circuit 34.

An example of a method for calculating the current limit value IbatMAX will be described below. Hereinbelow, the resistance model representing the resistance component of the power supply circuit that supplies the power supply voltage VR to the motor drive circuit 34 is referred to simply as "resistance model".

Figure 4:
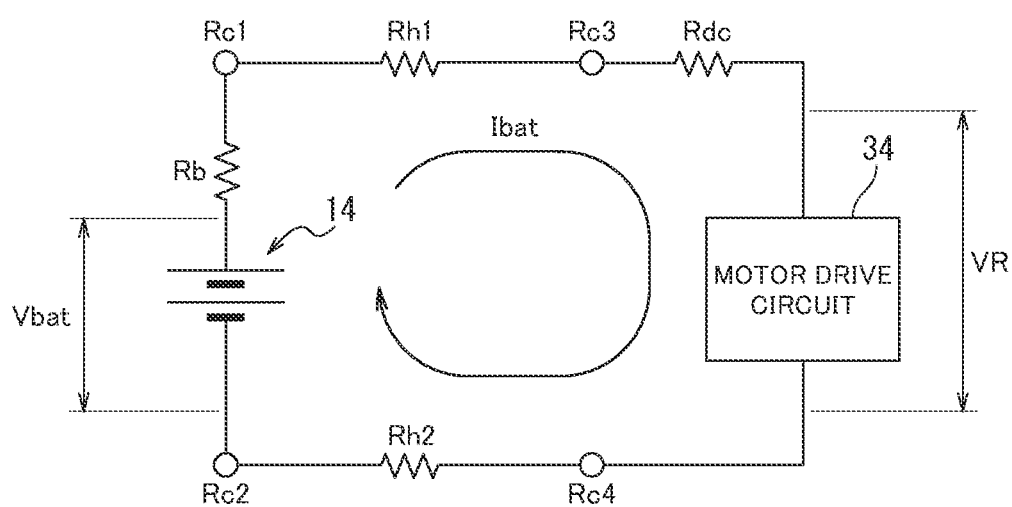
FIG. 4 is an illustrative diagram of an example of a resistance model of a power supply circuit.

FIG. 4 is an illustrative diagram of an example of the resistance model. For example, the resistance model includes an internal resistance Rb of the battery 14, contact resistances Rc1 and Rc2 of connectors connecting the battery 14 and a harness, harness resistances Rh1 and Rh2, contact resistances Rc3 and Rc4 connecting the harness and the electric power steering device, and a circuit resistance Rdc in the electric power steering device. A voltage Vbat indicates a generated voltage of the battery 14 before dropping due to the internal resistance Rb.

When a sum of resistance values of the above resistances Rb, Rc1 to Rc4, Rh1, Rh2, and Rdc is represented by Rs, the following equation (1) holds:

$$Vbat = VR + Rs \times Ibat \qquad (1)$$

Here, the current limit value IbatMAX that is the upper limit of the power supply current Ibat is set so as to be a power supply current Ibat at which the power supply voltage VR reaches the lower limit voltage VLo. In this case, the following equation (2) holds:

$$Vbat = VLo + Rs \times IbatMAX \qquad (2)$$

From equations (1) and (2), equation (3) for calculating the current limit value IbatMAX is obtained:

$$IbatMAX = (VR - VLo)/Rs + Ibat \qquad (3)$$

Here, the right first term ((VR−VLo)/Rs) represents an amount of fluctuation in the power supply current Ibat when the power supply voltage VR fluctuates from a current value detected by the voltage sensor 35 to the lower limit voltage VLo by a difference (VR−VLo).

In calculation equation (3), the sum of the amount of fluctuation in the power supply current Ibat when the power supply voltage VR fluctuates from the current value to the lower limit voltage VLo and a current value of the power supply current Ibat detected by the current sensor 36 is calculated as the current limit value IbatMAX.

Accordingly, the current limit value IbatMAX is calculated as the upper limit of the power supply current for setting the power supply voltage VR to the lower limit voltage VLo.

Note that while calculation equation (3) has considered only the resistance component, an impedance model of the power supply circuit may be used in consideration of an inductance component and a capacitance component in the power supply circuit to calculate the current limit value IbatMAX.

In addition, while in the above description, the applied voltage applied to the motor drive circuit 34 has been detected as the power supply voltage VR, a power supply voltage detected at various intermediate points between the battery 14 and the motor drive circuit 34 can be used as the power supply voltage VR. For example, when using a battery terminal voltage as the power supply voltage VR, the sum Rs of the resistance values is a sum of the internal resistance Rb of the battery 14 and the contact resistances Rc1 and Rc2 of the connectors.

Figure 3:
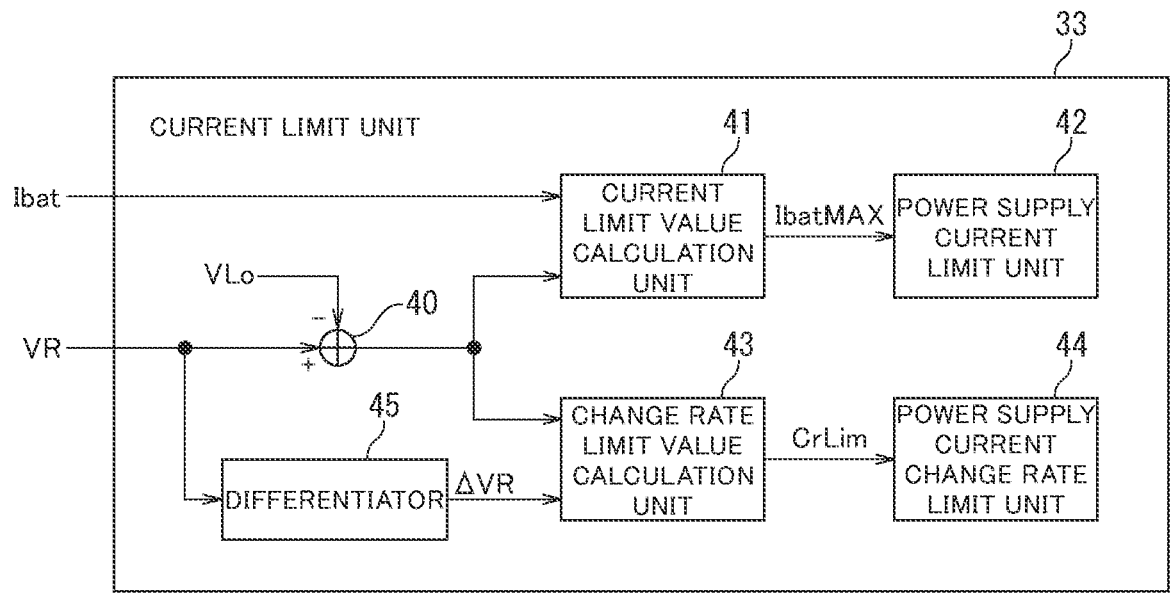
FIG. 3 is a block diagram illustrating an example of a functional structure of a current limit unit of a first embodiment.

Reference will be made to FIG. 3. The current limit value calculation unit 41 outputs the current limit value IbatMAX to the power supply current limit unit 42. The power supply current limit unit 42 limits the power supply current Ibat so that the upper limit of the power supply current Ibat flowing to the motor drive circuit 34 is the current limit value IbatMAX.

Figure 2:
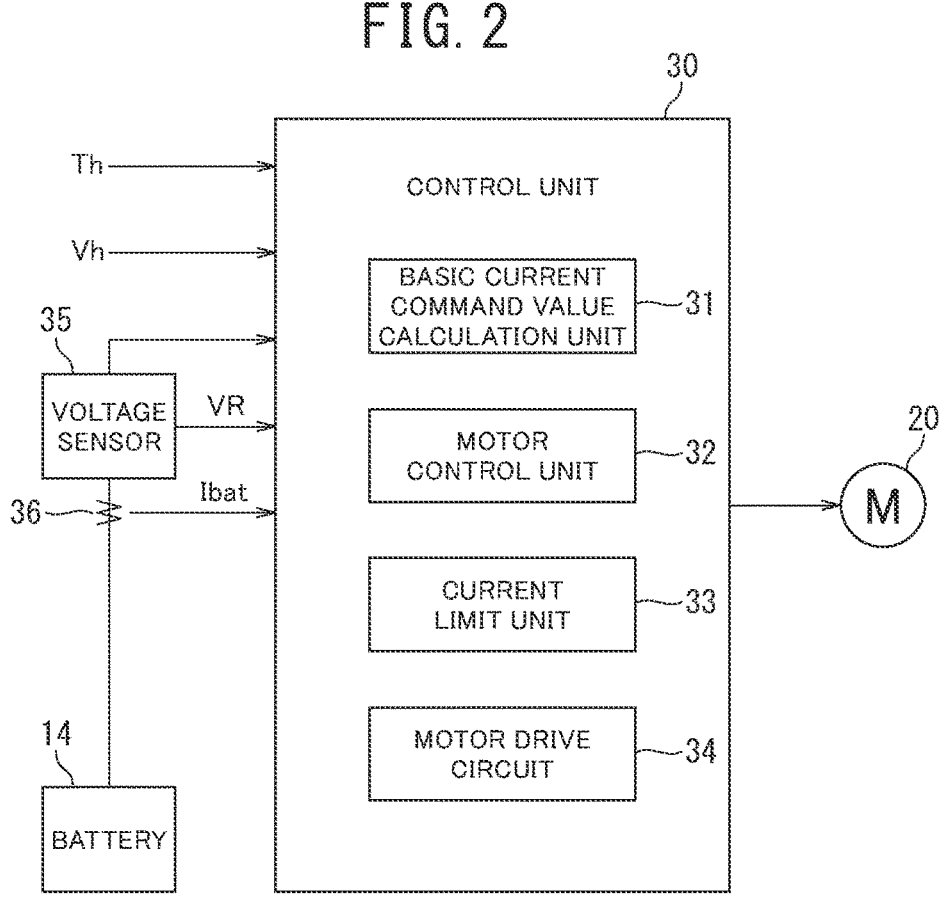
FIG. 2 is a block diagram illustrating an example of a functional structure of a control unit of the embodiment.

For example, the power supply current limit unit 42 may limit the upper limit of the current command value calculated by the basic current command value calculation unit 31 illustrated in FIG. 2 to limit the power supply current Ibat.

FIGS. 5A and 5B illustrate simulation results of the power supply current Ibat and the power supply voltage VR when the upper limit of the power supply current Ibat is limited by the power supply current limit unit 42. The simulation assumes a case where the generated voltage Vbat of the battery 14 is 12 [V], the lower limit voltage VLo is 9 [V], the sum Rs of the resistance values of the power supply circuit is 0.05 [Ω], and a current of 80 [A] suddenly flows at a certain time (0.01 seconds).

FIGS. 5A and 5B illustrate a waveform (power supply current before limitation) when there is no limitation by the power supply current limit unit 42 and waveforms when there is limitation by the power supply current limit unit 42.

Furthermore, as the waveforms when there is limitation by the power supply current limit unit 42, there are illustrated a waveform when there is no error between the resistance value Rs of the resistance model and an actual resistance of the power supply circuit and waveforms when the actual resistance value increases with respect to the resistance value Rs of the resistance model and there are error rates of 0.2, 0.4, 0.6, 0.8, and 1 (i.e., 20%, 40%, 60%, 80%, and 100%).

Hereinbelow, an error between the resistance value Rs of the resistance model and the actual resistance value of the power supply circuit is referred to as "model error". Additionally, the model error is defined as a difference obtained by subtracting the resistance value Rs of the resistance model from an actual resistance value (the actual resistance value−the resistance value Rs of the resistance model). In addition, a model error rate is defined as a value obtained by dividing the difference obtained by subtracting the resistance value Rs of the resistance model from the actual resistance value by the resistance value Rs of the resistance model {(the actual resistance value−the resistance value Rs of the resistance model)/the resistance value Rs of the resistance model}.

As illustrated in FIG. 5A, a current of 80 [A] flows when there is no limitation by the power supply current limit unit 42, whereas current is limited to less than 80 [A] when there is limitation by the power supply current limit unit 42.

Additionally, when there is no model error, the limited power supply current is immediately stabilized to the current limit value IbatMAX ((12 [V]−9 [V])/0.05 [Ω]=60 [A]), whereas when there is a model error, the limitation becomes unstable, causing oscillations of the power supply current Ibat and the power supply voltage VR. Particularly, when the model error rate is 100%, the oscillations do not converge. The reason that the oscillations occur when there is a model error is because the following situations (1) to (3) are repeated.

(1) When the power supply current Ibat is limited to 60 [A] at a time of 0.01 seconds, an actual resistance is larger than the resistance model, so that the power supply voltage VR excessively drops and becomes lower than an ideal value.

(2) After that, the limitation on the power supply current excessively works in response to the excessive voltage drop, thus leading to a rapid recovery of the power supply voltage VR.

(3) In response to the rapid recovery of the power supply voltage VR, the limitation on the power supply current is also rapidly weakened, as a result of which the power supply current rapidly increases, and the power supply voltage VR excessively drops and becomes lower than the ideal value.

Reference will be made to FIG. 3. The current limit unit 33 includes a change rate limit value calculation unit 43 and a power supply current change rate limit unit 44, and prevents a rapid increase in the power supply current in the above situation (3) by limiting a change rate in an increasing direction of the power supply current.

The change rate limit value calculation unit 43 calculates a change rate limit value CrLim responsive to the difference (VR−VLo). The change rate limit value calculation unit 43 may use, for example, a calculation map for the change rate limit value CrLim having characteristics illustrated in FIG. 6 to calculate the change rate limit value CrLim.

Figure 6:
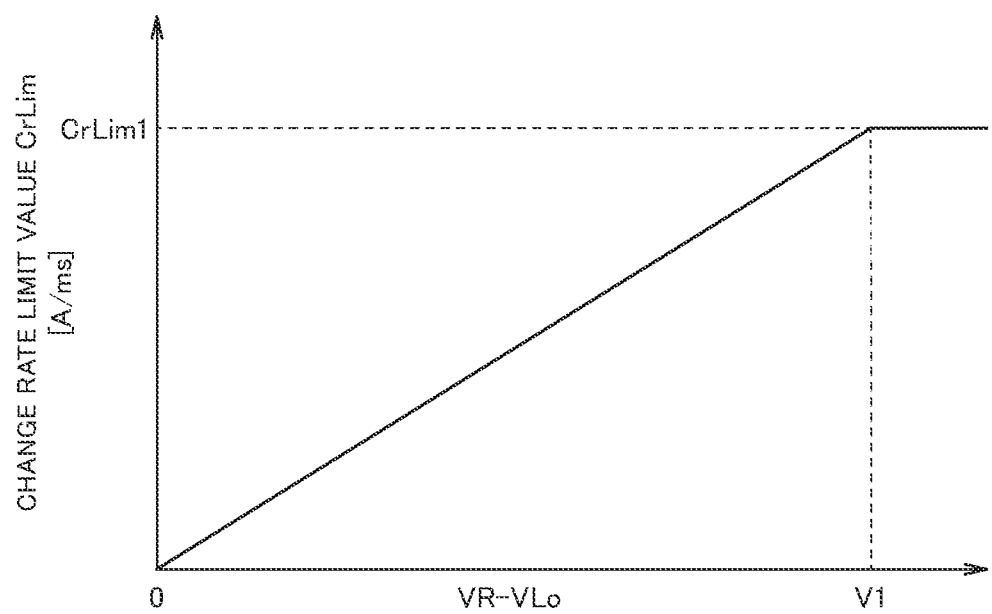
FIG. 6 is an illustrative diagram of a first example of a calculation map of a change rate limit value CrLim.

In the example of FIG. 6, when the difference (VR−VLo) changes from 0 to a predetermined value V1, the change rate limit value CrLim changes from 0 to a predetermined value CrLim1, and when the difference (VR−VLo) is equal to or more than the predetermined value V1, the change rate limit value CrLim is maintained at the predetermined value CrLim1.

Reference will be made to FIG. 3. The power supply current change rate limit unit 44 limits the change rate of the power supply current Ibat on the basis of the change rate limit value CrLim calculated by the change rate limit value calculation unit 43. For example, the power supply current change rate limit unit 44 limits the change rate of the power supply current Ibat so that a change rate in the increasing direction of the power supply current Ibat (i.e., a change rate in the increasing power supply current Ibat) becomes equal to or less than the change rate limit value CrLim.

For example, the power supply current change rate limit unit 44 may limit a change rate in the current command value calculated by the basic current command value calculation unit 31 illustrated in FIG. 2 to limit the change rate in the power supply current Ibat.

Figure 7A:
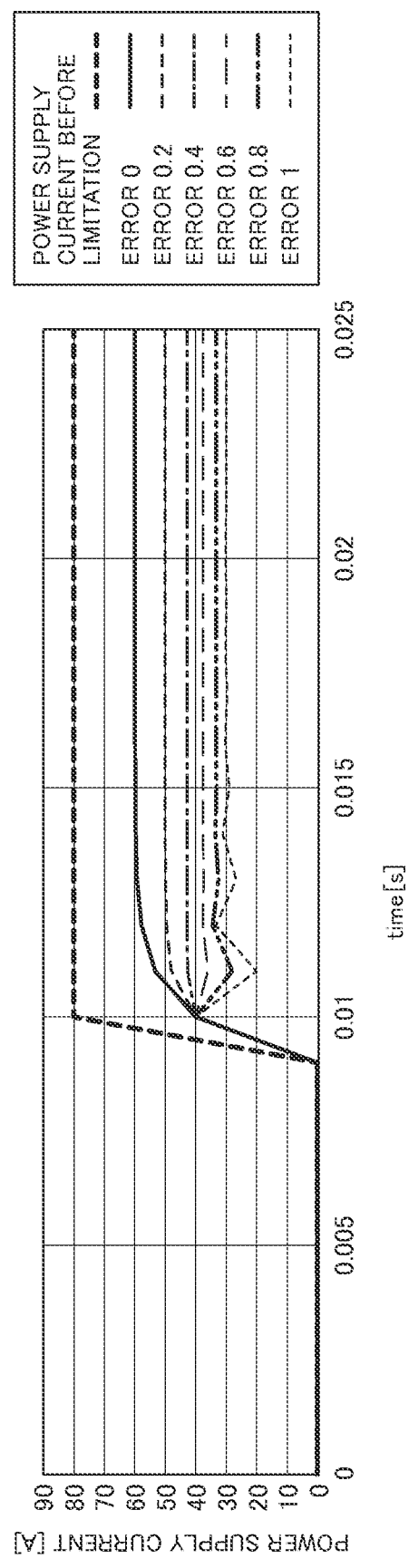
FIGS. 7A and 7B are time charts illustrating simulation results of the power supply current and the power supply voltage when the current power supply is limited by the power supply current limit unit and change rate is limited by a power supply current change rate limit unit.
Figure 7B:
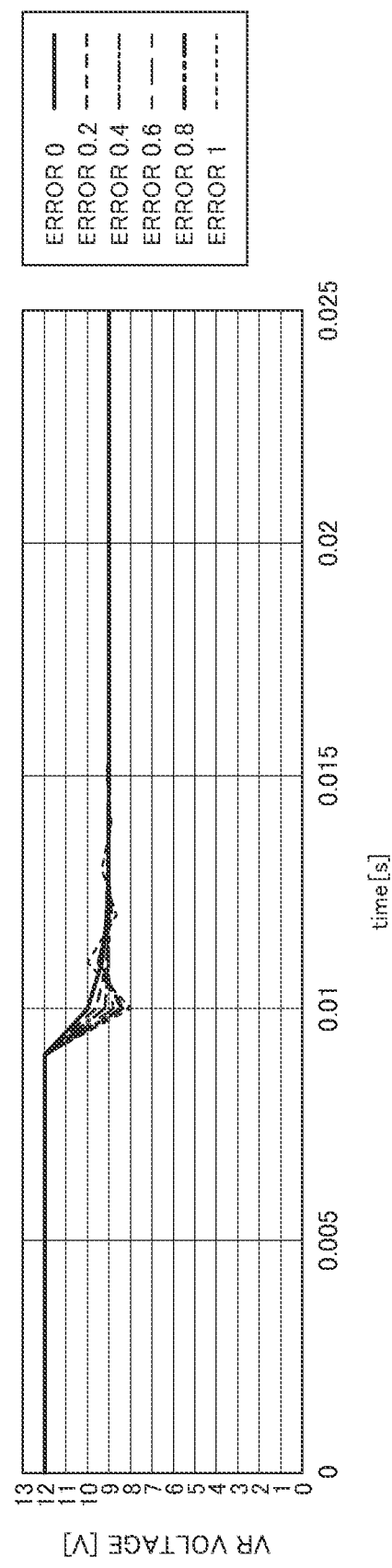

FIGS. 7A and 7B illustrate simulation results of the power supply current Ibat and the power supply voltage VR when the upper limit of the current power supply Ibat is limited by the power supply current limit unit 42 and the change rate is limited by the power supply current change rate limit unit 44.

Simulation conditions and legend for each waveform are the same as those of the FIGS. 5A and 5B.

It is shown that the change rate limitation by the power supply current change rate limit unit 44 improves the unstable limitation on the power supply current Ibat and the power supply voltage VR due to the model error, and more stabilizes the power supply current Ibat and the power supply voltage VR.

However, in the waveform of the power supply current Ibat when there is no model error, the power supply current Ibat increases gently compared with the waveform when there is no change rate limitation (see FIG. 5A), which indicates that the limitation is slightly excessive.

On the other hand, when the model error rate is 100%, it takes time until the power supply current Ibat and the power supply voltage VR are stabilized. Thus, it is desirable to strengthen the change rate limitation to shorten the convergence time.

Accordingly, the present invention improves excessive or insufficient limitation on the change rate by the power supply current change rate limit unit 44 by changing a strength of the change rate limitation by the power supply current change rate limit unit 44 according to a magnitude of the model error (i.e., the amount of increase in an actual resistance value with respect to the resistance value Rs of the resistance model).

For example, as the actual resistance value of the power supply circuit increases and the model error becomes larger, the change rate limitation by the power supply current change rate limit unit 44 may be more strengthened. Conversely, as the model error becomes smaller (the difference between the resistance value Rs of the resistance model and an actual resistance value of the power supply circuit (the actual resistance value of the power supply circuit−the resistance value Rs of the resistance model) becomes smaller), the change rate limitation by the power supply current change rate limit unit 44 may be more weakened.

Here, there is used a property that when the actual resistance value of the power supply circuit increases, the amount of change in the power supply voltage VR (i.e., a change speed of the power supply voltage VR) with respect to a change in the power supply current Ibat equal in magnitude increases.

Therefore, the change rate limit value calculation unit 43 corrects the change rate limit value CrLim according to the change speed of the power supply voltage VR.

In the first embodiment, the change rate limit value CrLim is corrected according to a differential amount of the detected value of the power supply voltage VR as the change speed of the power supply voltage VR.

Reference will be made to FIG. 3. A differentiator 45 calculates a differential value ΔVR of the detected value of the power supply voltage VR. The change rate limit value calculation unit 43 makes the change rate limit value CrLim smaller as a differential amount (−ΔVR) in a decreasing direction of the detected value of the power supply voltage VR, that is, a decrease rate of the detected value of the power supply voltage VR (a magnitude of a negative differential value of the power supply voltage VR) becomes larger, thereby more strengthening the change rate limitation as the model error becomes larger.

As a result, the change rate limit value CrLim is set so that the change rate in the increasing direction of the power supply current Ibat is more limited as a decrease speed of the detected value of the power supply voltage VR becomes larger.

Figure 8A:
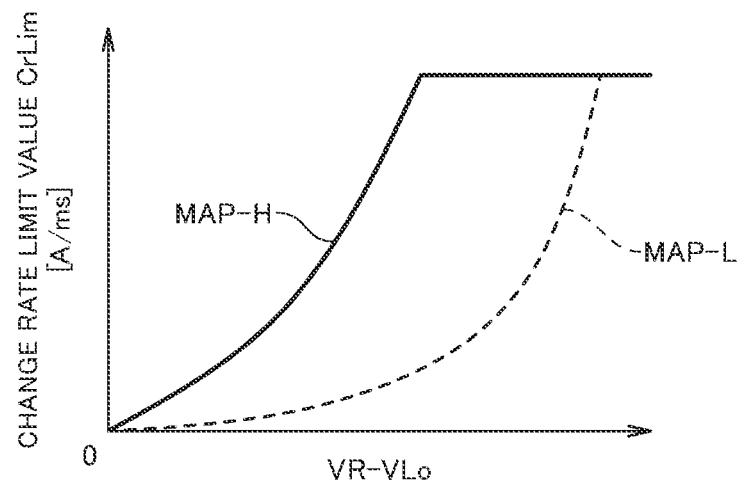
FIG. 8A is an illustrative diagram of a second example of the calculation map of the change rate limit value CrLim.

The change rate limit value calculation unit 43 may use a plurality of calculation maps MAP-L and MAP-H illustrated in FIG. 8A to calculate the change rate limit value CrLim.

The plurality of calculation maps MAP-L and MAP-H are maps that specify the change rate limit value CrLim for the difference (VR−VLo) by using the difference (VR−VLo) as a parameter, and can be used to calculate the change rate limit value CrLim responsive to the difference (VR−VLo).

In the examples of the calculation maps MAP-L and MAP-H illustrated in FIG. 8A, the change rate limit value CrLim increases as the difference (VR−VLo) increases, and the change rate limit value CrLim is constant in a range where the difference (VR−VLo) is equal to or more than a threshold value.

The plurality of calculation maps MAP-L and MAP-H each specify different change rate limit values CrLim for the same difference (VR−VLo). Accordingly, the magnitude of a value of the change rate limit value CrLim calculated by the calculation map MAP-L is different from the magnitude of a value of the change rate limit value CrLim calculated by the calculation map MAP-H.

Specifically, the value calculated by the calculation map MAP-L for the difference (VR−VLo) equal in magnitude is smaller than the value calculated by the calculation map MAP-H. Therefore, the calculation map MAP-L is used to calculate the change rate limit value CrLim relatively strong in limitation, and the calculation map MAP-H is used to calculate the change rate limit value CrLim relatively weak in limitation.

Figure 8B:
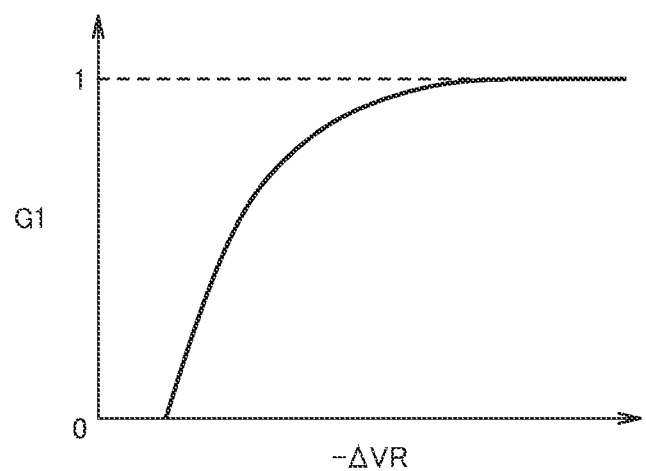
FIG. 8B is a first example of a gain calculation map.

Additionally, the change rate limit value calculation unit 43 calculates a gain G1 using a gain calculation map illustrated in FIG. 8B.

The gain G1 is responsive to the differential amount (−ΔVR) in the decreasing direction of the detected value of the power supply voltage VR, that is, the decrease rate of the detected value of the power supply voltage VR (the magnitude of the negative differential value of the power supply voltage VR), and gradually increases from the value "0" to the value "1" as the differential amount (−ΔVR) increases in a range where the differential amount (−ΔVR) is large to some extent.

The change rate limit value calculation unit 43 changes the change rate limit value CrLim according to the differential amount of the detected value of the power supply voltage VR by synthesizing outputs of the calculation maps MAP-L and MAP-H according to the gain G1 on the basis of the following equation (4):

$$\text{Change rate limit value } Cr\text{Lim}=(\text{MAP-}H \text{ output})\times(1-G1)+(\text{MAP-}L \text{ output})\times G1 \quad (4)$$

Figure 9A:
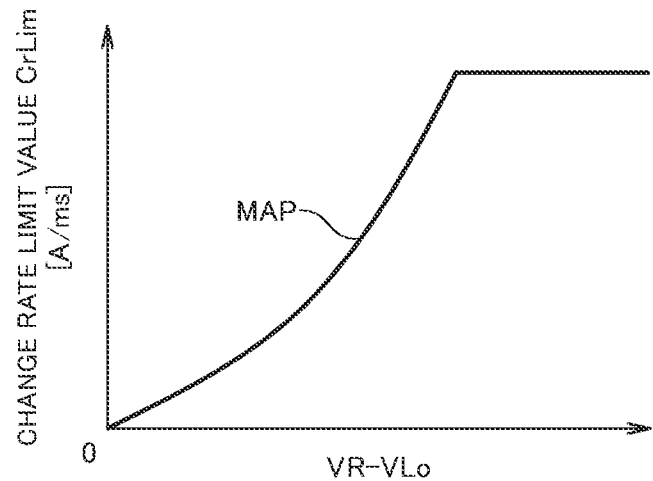
FIG. 9A is an illustrative diagram of a third example of the calculation map of the change rate limit value CrLim.
Figure 9B:
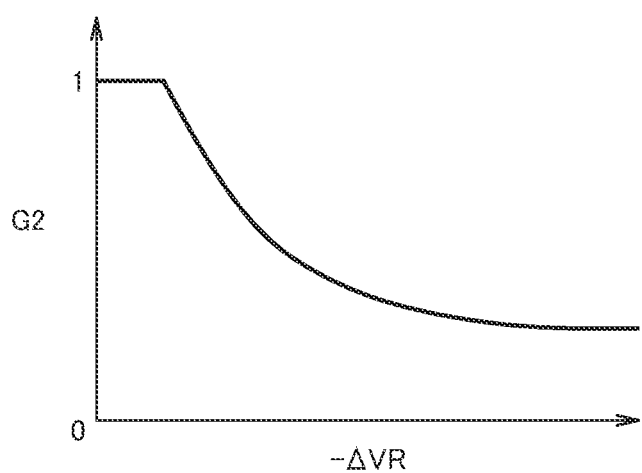
FIG. 9B is a second example of the gain calculation map.

Instead of the above, the change rate limit value calculation unit 43 may use a single calculation map MAP illustrated in FIG. 9A and a gain calculation map illustrated in FIG. 9B to calculate the change rate limit value CrLim that changes according to the differential amount of the detected value of the power supply voltage VR.

The calculation map MAP is a map that specifies the change rate limit value CrLim for the difference (VR−VLo) by using the difference (VR−VLo) as a parameter, and can be used to calculate the change rate limit value CrLim responsive to the difference (VR−VLo).

In the example of the calculation maps MAP illustrated in FIG. 9A, the change rate limit value CrLim increases as the difference (VR−VLo) increases, and the change rate limit value CrLim is constant in a range where the difference (VR−VLo) is equal to or more than a threshold value.

The change rate limit value calculation unit 43 uses the gain calculation map illustrated in FIG. 9B to calculate a gain G2 that is responsive to the differential amount (−ΔVR) in the decreasing direction of the detected value of the power supply voltage VR and that gradually decreases from the value "1" as the differential amount (−ΔVR) increases in a range where the differential amount (−ΔVR) is large to some extent.

The change rate limit value calculation unit 43 multiplies the change rate limit value calculated by the calculation map MAP by the gain G2 to calculate the change rate limit value CrLim that changes according to the differential amount of the detected value of the power supply voltage VR.

Note that the above-described method for calculating the change rate limit value CrLim is illustrative, and the present invention is not limited thereto. The change rate limit value CrLim may be calculated by various methods as long as the change rate limitation by the power supply current change rate limit unit 44 can be more strengthened as the differential amount in the decreasing direction of the detected value of the power supply voltage VR becomes larger.

Operation

Figure 10:
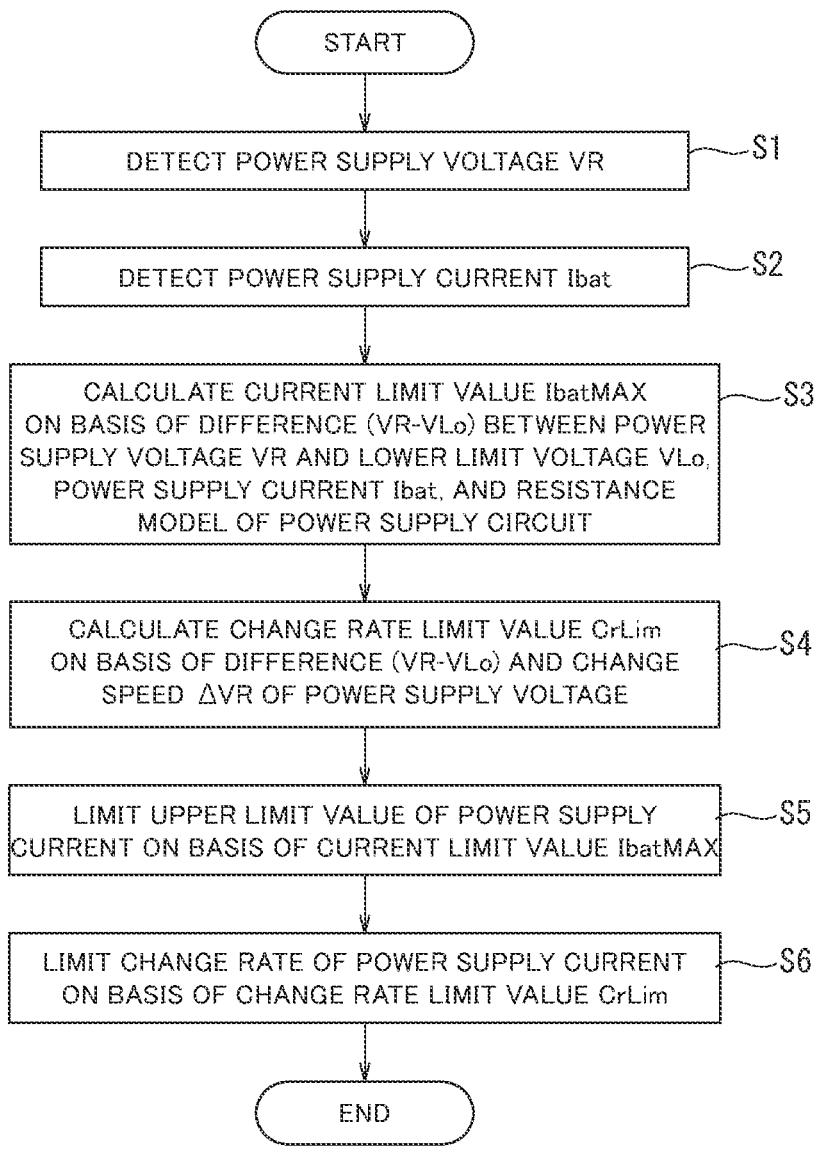
FIG. 10 is a flowchart of an example of a power supply current control method of the embodiment.

Next, an example of an actuator control method according to the first embodiment will be described with reference to FIG. 10.

At step S1, the voltage sensor 35 detects the power supply voltage VR.

At step S2, the current sensor 36 detects the power supply current Ibat.

At step S3, the current limit value calculation unit 41 calculates the current limit value IbatMAX on the basis of the difference (VR−VLo) obtained by subtracting the predetermined lower limit voltage VLo from the detected value of the power supply voltage VR, the detected value of the power supply current Ibat, and the resistance model representing the resistance component of the power supply circuit.

At step S4, the change rate limit value calculation unit 43 calculates the change rate limit value CrLim on the basis of the difference (VR−VLo) and the change speed ΔVR of the power supply voltage.

At step S5, the power supply current limit unit 42 limits the upper limit value of the power supply current Ibat on the basis of the current limit value IbatMAX.

At step S6, the power supply current change rate limit unit 44 limits the change rate of the power supply current Ibat on the basis of the change rate limit value CrLim.

After that, processing is ended.

Effects of First Embodiment (1) The voltage sensor 35 detects the power supply voltage VR applied from the power supply circuit including the battery 14. The current sensor 36 detects the power supply current Ibat supplied from the power supply circuit. The current limit value calculation unit 41 calculates the current limit value IbatMAX on the basis of the difference (VR−VLo) between the power supply voltage VR detected by the voltage sensor 35 and the predetermined set voltage VLo, the power supply current Ibat detected by the current sensor 36, and the resistance model representing the resistance component of the power supply circuit. The power supply current limit unit 42 limits the magnitude of the power supply current Ibat on the basis of the current limit value IbatMAX. The change rate limit value calculation unit 43 calculates the change rate limit value CrLim on the basis of the difference (VR−VLo) and the change speed of the power supply voltage VR. The power supply current change rate limit unit 44 limits the change rate of the power supply current Ibat on the basis of the change rate limit value CrLim.

In this way, calculating the current limit value IbatMAX on the basis of not only the power supply voltage VR but also the detected value of the power supply current Ibat and the resistance model of the power supply circuit can suppress the current limit value IbatMAX from being set excessively smaller or excessively larger.

Limiting the change rate of the power supply current Ibat can suppress the power supply current and the power supply voltage from becoming unstable even when an error occurs between the resistance model and the actual resistance value of the power supply circuit.

Additionally, calculating the change rate limit value CrLim according to the change speed of the power supply voltage VR can improve excessive or insufficient limitation on the change rate of the power supply current Ibat by the power supply current change rate limit unit 44.

(2) The change rate limit value calculation unit 43 sets the change rate limit value CrLim to more limit the change rate in the increasing direction of the power supply current Ibat as the decrease speed of the detected value of the power supply voltage VR becomes larger. For example, the differentiator 45 may calculate the differential value ΔVR of the power supply voltage VR detected by the voltage sensor 35, and the change rate limit value calculation unit 43 may calculate the change rate limit value CrLim on the basis of the difference (VR−VLo) and the differential value ΔVR. As a result, excessive or insufficient limitation on the change rate of the power supply current Ibat by the power supply current change rate limit unit 44 can be improved.

Second Embodiment

Next, the current limit unit 33 of a second embodiment will be described. Structures of the electric power steering device and the control unit 30 are the same as those in the first embodiment described above with reference to FIGS. 1 and 2.

If the detected value of the power supply voltage VR and the detected value of the power supply current Ibat include a noise component, noise is added to the current limit value IbatMAX calculated by the current limit value calculation unit 41 and the change rate limit value CrLim calculated by the change rate limit value calculation unit 43, making inappropriate the limitations by the power supply current limit unit 42 and the power supply current change rate limit unit 44.

Therefore, the current limit unit 33 of the second embodiment includes at least one of a filter configured to smooth the detected value of the power supply voltage VR and a filter configured to smooth the detected value of the power supply current Ibat.

Figure 11:
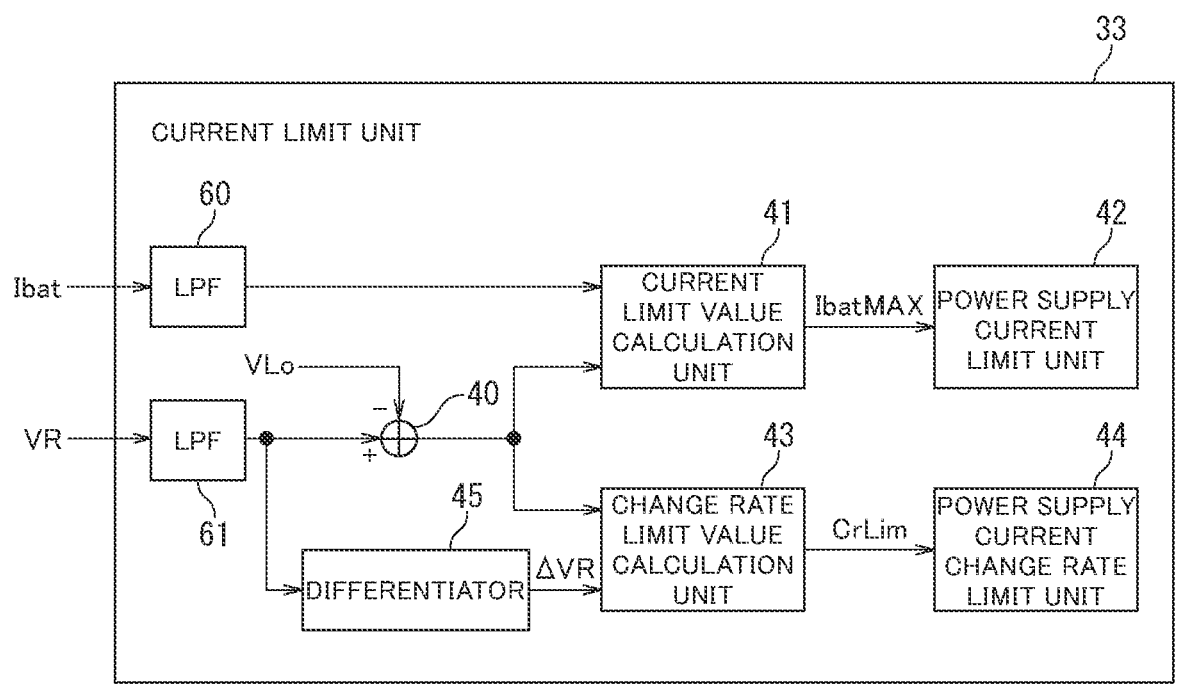
FIG. 11 is a block diagram illustrating an example of a functional structure of a current limit unit of a second embodiment.

Reference will be made to FIG. 11. The current limit unit 33 of the second embodiment has the similar functional structure as the first embodiment illustrated in FIG. 3, and the same reference signs denote the similar components.

The current limit unit 33 of the second embodiment includes a low pass filter (LPF) 60 configured to smooth the detected value of the power supply current Ibat and a low pass filter 61 configured to smooth the detected value of the power supply voltage VR.

The calculations of the current limit value IbatMAX and the change rate limit value CrLim by the subtractor 40, the current limit value calculation unit 41, the change rate limit value calculation unit 43, and the differentiator 45 are the same as those in the first embodiment except that the respective values after smoothing are used instead of the detected value of the power supply voltage VR as is and the detected value of the power supply current Ibat as is.

Even third and fourth embodiments that will be described below may include the low pass filter 60 configured to smooth a detected value of the power supply current Ibat and the low pass filter 61 configured to smooth a detected value of the power supply voltage VR. Filters configured to smooth the detected values are not limited to low pass filters, and an averaging method or other methods can be used.

Effect of Second Embodiment

The current limit unit 33 includes at least one of the low pass filter 60 configured to smooth the detected value of the power supply current Ibat and the low pass filter 61 configured to smooth the detected value of the power supply voltage VR. As a result, it can be prevented that the limitations by the power supply current limit unit 42 and the power supply current change rate limit unit 44 become inappropriate because noise is added to the current limit value IbatMAX calculated by the current limit value calculation unit 41 and the change rate limit value CrLim calculated by the change rate limit value calculation unit 43 due to a noise component included in the detected value of the power supply voltage VR and the detected value of the power supply current Ibat.

Third Embodiment

Next, the current limit unit 33 of the third embodiment will be described. Structures of the electric power steering device and the control unit 30 are the same as those in the first embodiment described above with reference to FIGS. 1 and 2.

When the current limit value IbatMAX calculated by the current limit value calculation unit 41 and the change rate limit value CrLim calculated by the change rate limit value calculation unit 43 oscillate, the limitations by the power supply current limit unit 42 and the power supply current change rate limit unit 44 become unstable.

Therefore, the current limit unit 33 of the third embodiment includes at least one of a rate limiter configured to limit a change rate of the current limit value IbatMAX calculated by the current limit value calculation unit 41 and a rate limiter configured to limit a change rate of the change rate limit value CrLim calculated by the change rate limit value calculation unit 43.

Additionally, the differential value ΔVR of the detected value of the power supply voltage VR tends to change suddenly due to a noise component and an oscillation component included in the power supply voltage VR. The same applies to the above-described gains G1 and G2 calculated according to the differential value ΔVR.

Therefore, the current limit unit 33 of the third embodiment includes a rate limiter configured to limit a change rate of the differential value ΔVR calculated by the differentiator 45.

Figure 12:
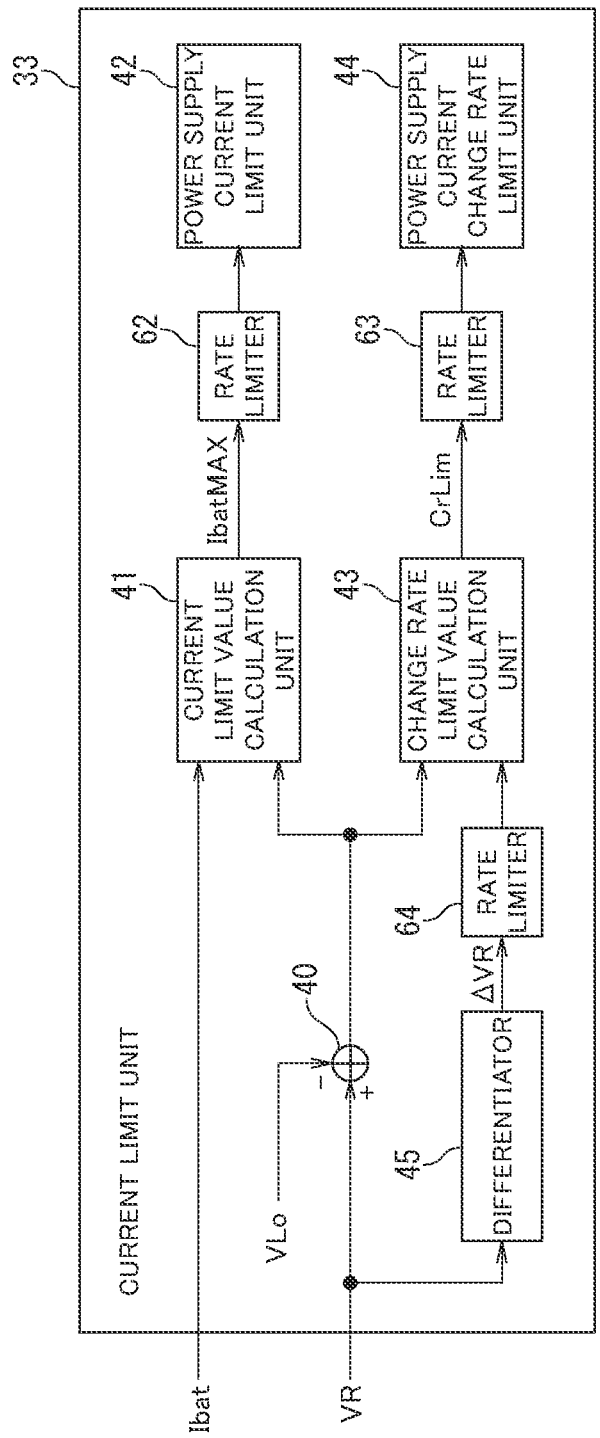
FIG. 12 is a block diagram illustrating an example of a functional structure of a current limit unit of a third embodiment.

Reference will be made to FIG. 12. The current limit unit 33 of the third embodiment has the similar functional structure as the first embodiment illustrated in FIG. 3, and the same reference signs denote the similar components.

The current limit unit 33 of the third embodiment includes a rate limiter 62 configured to limit the change rate of the current limit value IbatMAX calculated by the current limit value calculation unit 41, a rate limiter 63 configured to limit the change rate of the change rate limit value CrLim calculated by the change rate limit value calculation unit 43, and a rate limiter 64 configured to limit the change rate of the differential value ΔVR calculated by the differentiator 45.

The calculation of the change rate limit value CrLim by the change rate limit value calculation unit 43 is the same as that in the first embodiment except for use of a value after change rate limitation by the rate limiter 64 instead of the differential value ΔVR as is of the detected value of the power supply voltage VR. The rate limiter 64 may be arranged so as to limit change rates of the above-descried gains G1 and G2 calculated according to the differential value ΔVR instead of the change rate limitation on the differential value ΔVR of the detected value of the power supply voltage VR.

In addition, the power supply current limit unit 42 limits the upper limit value of the power supply current Ibat on the basis of the current limit value IbatMAX after the change rate limitation by the rate limiter 62. The power supply current change rate limit unit 44 limits the change rate of the power supply current Ibat on the basis of the change rate limit value CrLim after the change rate limitation by the rate limiter 63.

An upper limit value of the change rate limited by the rate limiter 62 may be different depending on whether the current limit value IbatMAX increases or decreases. For example, the upper limit of a change rate when the current limit value IbatMAX increases (i.e., in a direction in which the limitation is relaxed) may be set less than the upper limit of a change rate when the current limit value IbatMAX decreases (i.e., in a direction in which the limitation is strengthened).

Similarly, an upper limit value of the change rate limited by the rate limiter 63 may also be different depending on whether the change rate limit value CrLim increases or decreases. For example, the upper limit of a change rate when the change rate limit value CrLim increases may be set less than the upper limit of a change rate when the change rate limit value CrLim decreases.

As a result, when relaxing the limitations by these limit values IbatMAX and CrLim, rapid relaxation is prevented. On the other hand, when it is necessary to immediately limit the power supply current Ibat in response to a rapid decrease in the power supply voltage VR, it is possible to make limitations less likely to be applied on changes in the limit values IbatMAX and CrLim.

Furthermore, the rate limiter 62 may be configured so as not to limit change in the current limit value IbatMAX when the current limit value IbatMAX decreases. Similarly, the rate limiter 63 may be configured so as not to limit change in the change rate limit value CrLim when the change rate limit value CrLim decreases.

Similarly, an upper limit value of the change rate limited by the rate limiter 64 may also be different depending on whether the differential value ΔVR increases or decreases. For example, the upper limit of a change rate in the differential value ΔVR when the change rate limit value CrLim finally calculated increases (i.e., in the direction in which the limitation is relaxed) may be set less than the upper limit of a change rate in the differential value ΔVR when the change rate limit value CrLim decreases (i.e., in the direction in which the limitation is strengthened).

Even the fourth embodiment that will be described below may include the rate limiter 62 configured to limit the change rate of the current limit value IbatMAX calculated by the current limit value calculation unit 41 and the rate limiter 63 configured to limit the change rate of the change rate limit value CrLim calculated by the change rate limit value calculation unit 43.

Effect of Third Embodiment (1) The current limit unit 33 includes at least one of the rate limiter 62 configured to limit the change rate of the current limit value IbatMAX calculated by the current limit value calculation unit 41 and the rate limiter 63 configured to limit the change rate of the change rate limit value CrLim calculated by the change rate limit value calculation unit 43.

This can suppress destabilization of the limitations by the power supply current limit unit 42 and the power supply current change rate limit unit 44 due to oscillations of the current limit value IbatMAX and the change rate limit value CrLim.

(2) The current limit unit 33 includes the rate limiter 64 configured to limit the change rate of the differential value ΔVR calculated by the differentiator 45. This can suppress a sudden change in the differential value ΔVR due to a noise component and an oscillation component included in the power supply voltage VR and a sudden change in the above-described gains G1 and G2 calculated according to the differential value ΔVR.

Fourth Embodiment

Next, the current limit unit 33 of the fourth embodiment will be described. Structures of the electric power steering device and the control unit 30 are the same as those in the first embodiment described above with reference to FIGS. 1 and 2.

As described above, the limitation on the power supply current Ibat becomes unstable when there is a model error between the resistance value Rs of the resistance model for use in the calculation of the current limit value IbatMAX and the actual resistance value of the power supply circuit.

Therefore, the current limit unit 33 of the fourth embodiment calculates an estimated value Rse of the resistance component of the power supply circuit, and calculates the current limit value on the basis of the difference (VR−VLo), the detected value of the power supply current Ibat, and the estimated value Rse.

Furthermore, the power supply current change rate limit unit 44 of the fourth embodiment calculates the gains G1 and G2 that changes the change rate limit value CrLim on the basis of a difference (Rse−Rs) or a ratio (Rse/Rs) between the estimated value Rse and the resistance value Rs of the resistance model instead of the differential value ΔVR of the power supply voltage VR.

As described above, the power supply current change rate limit unit 44 intends to correct the change rate limit value CrLim according to the magnitude of the model error (i.e., the amount of increase in the actual resistance value with respect to the resistance value Rs of the resistance model). Thus, calculating the gains G1 and G2 on the basis of the difference (Rse−Rs) or the ratio (Rse/Rs) between the estimated value Rse and the resistance value Rs of the resistance model enables appropriate correction according to an increase in the resistance of the power supply circuit.

Figure 13:
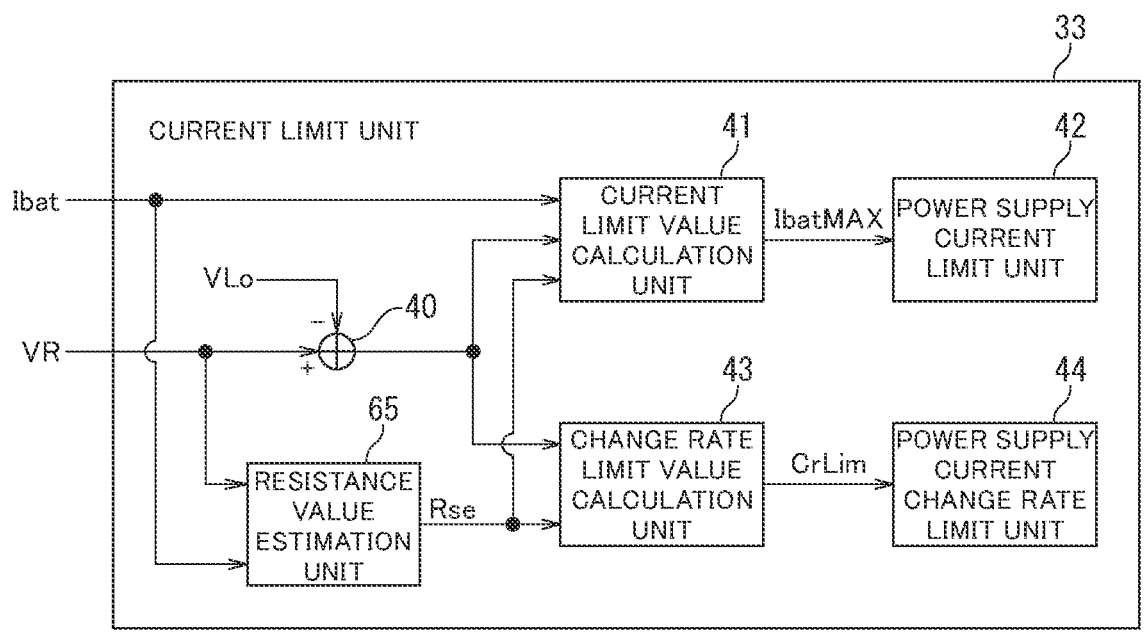
FIG. 13 is a block diagram illustrating an example of a functional structure of a current limit unit of a fourth embodiment.

Reference will be made to FIG. 13. The current limit unit 33 of the fourth embodiment has the similar functional structure as the first embodiment illustrated in FIG. 3, and the same reference signs denote the similar components.

The current limit unit 33 of the fourth embodiment includes a resistance value estimation unit 65 configured to calculate the estimated value Rse of the resistance component of the power supply circuit.

The resistance value estimation unit 65 calculates the estimated value Rse of the resistance component of the power supply circuit on the basis of detected values of the power supply voltage VR and detected values of the power supply current Ibat at different times.

When the power supply voltage, the power supply current, and the generated voltage of the battery 14, respectively, at a certain sampling time t1 are represented by VR1, Ibat1, and Vbat1, the following equation (5) holds:

$$Vbat1 = VR1 + Rse \times Ibat1 \quad (5)$$

Additionally, when the power supply voltage, the power supply current, and the generated voltage of the battery 14, respectively, at a sampling time t2 different from the sampling time t1 are represented by VR2, Ibat2, and Vbat2, the following equation (6) holds:

$$Vbat2 = VR2 + Rse \times Ibat2 \quad (6)$$

When it is assumed that the generated voltage of the battery 14 does not much change and Vbat1≈Vbat2, equation (7) for calculating the estimated value Rse of the resistance component is obtained from equations (5) and (6):

$$Rse = -(VR1 - VR2)/(Ibat1 - Ibat2) \quad (7)$$

In other words, the resistance value estimation unit 65 calculates, as the estimated value Rse of the resistance component, a ratio obtained by diving a difference (VR2−VR1) between the power supply voltages VR1 and VR2 detected at the sampling times t1 and t2 by a difference (Ibat1−Ibat2) between the power supply currents Ibat1 and Ibat2 detected at the sampling times t1 and t2.

Note that, in order to maintain accuracy of the estimated value Rse, the resistance value estimation unit 65 may adopt a result of calculation of the estimated value Rse only when the difference (VR2−VR1) between the power supply voltages VR1 and VR2 and the difference (Ibat1−Ibat2) between the power supply currents Ibat1 and Ibat2 exceed a predetermined value. In addition, since calculation equation (7) assumes that Vbat1 and Vbat2 are substantially equal, it is preferable that the sampling times t1 and t2 are not too far apart in time.

The resistance value estimation unit 65 outputs the calculated estimated value Rse to the current limit value calculation unit 41 and the change rate limit value calculation unit 43.

The current limit value calculation unit 41 calculates the current limit value IbatMAX by replacing the Rs of the above calculation equation (3) with the estimated value Rse.

The change rate limit value calculation unit 43 changes the change rate limit value CrLim on the basis of the difference (Rse−Rs) or the ratio (Rse/Rs) between the estimated value Rse and the resistance value Rs of the resistance model instead of the differential value ΔVR of the power supply voltage VR.

In other words, the change rate limit value calculation unit 43 calculates the change rate limit value CrLim on the basis of the difference (VR−VLo) and the difference (Rse−Rs) or the ratio (Rse/Rs) between the resistance value Rs of the resistance model and the estimated value Rse.

Here, when the resistance value of the power supply circuit increases, the change speed of the power supply voltage VR with respect to a current change equal in magnitude increases, and the amount of the increase in the change speed of the power supply voltage VR at this time is proportional to the amount of the increase in the resistance value. Accordingly, calculating the change rate limit value CrLim on the basis of the difference (Rse−Rs) or the ratio (Rse/Rs) can be said to be equivalent to calculating the change rate limit value CrLim on the basis of the change speed of the power supply voltage VR.

The change rate limit value calculation unit 43 may change the change rate limit value CrLim so that the change rate limit value CrLim becomes smaller as the estimated value Rse becomes larger than the resistance value Rs of the resistance model.

For example, the gain calculation maps of FIGS. 8B and 9B may be changed to maps of the gains G1 and G2 responsive to the difference (Rse−Rs) or the ratio (Rse/Rs) instead of the differential amount (−ΔVR) in the decreasing direction of the detected value of the power supply voltage VR.

It should be noted that, in terms of correcting influence due to an increase in the resistance value, it is more appropriate to correct the change rate limit value CrLim on the basis of the difference (Rse−Rs) or the ratio (Rse/Rs) between the estimated value Rse and the resistance Rs of the resistance model than to correct the change rate limit value CrLim according to the differential amount (−ΔVR) of the power supply voltage VR as in the first embodiment.

On the other hand, correction according to the differential amount (−ΔVR) of the power supply voltage VR can be considered to have the following advantage.

Specifically, when responsiveness of the power supply current limit unit 42 and the power supply current change rate limit unit 44 is insufficient even if there is no model error, the power supply current Ibat cannot be immediately limited according to the current limit value IbatMAX and the change rate limit value CrLim. Thus, by strengthening limitation on the change rate of the power supply current Ibat according to the differential amount (−ΔVR) of the power supply voltage VR, it is possible to preventively avoid delay of limitation on the power supply current Ibat due to the insufficient responsiveness.

Accordingly, the change rate limit value calculation unit 43 may select a gain that lowers the change rate limit value CrLim more from the gain G1 or G2 responsive to the differential amount (−ΔVR) of the power supply voltage VR and the gain G1 or G2 responsive to the difference (Rse−Rs) or the ratio (Rse/Rs), and may use the selected gain. As a result, the change rate limit value calculation unit 43 can achieve both a correction effect on the increased resistance and an effect of preventing the insufficient responsiveness to the limitation on the power supply current.

Note that in this way, when performing both the correction of the change rate limit value CrLim by the differential amount (−ΔVR) of the power supply voltage VR and the correction of the change rate limit value CrLim by the difference (Rse−Rs) or the ratio (Rse/Rs), there may be included the rate limiter 64 configured to limit the change rate of the differential value ΔVR calculated by the differentiator 45.

Effects of Fourth Embodiment (1) The resistance value estimation unit 65 calculates the estimated value Rse of the resistance component of the power supply circuit. The current limit value calculation unit 41 calculates the current limit value IbatMAX on the basis of the difference (VR−VLo), the detected value of the power supply current Ibat, and the estimated value Rse.

This can suppress the limitation on the power supply current Ibat from becoming unstable due to a model error.

(2) The change rate limit value calculation unit 43 calculates the change rate limit value CrLim on the basis of the difference (VR−VLo) and the difference (Rse−Rs) or the ratio (Rse/Rs) between the resistance value Rs of the resistance model and the estimated value Rse. This enables the change rate limit value CrLim to be more appropriately corrected according to an increase in the resistance of the power supply circuit.

(Modifications)

(1) The current detecting means configured to detect the power supply current Ibat is not limited to the current sensor 36. The current detecting means may estimate the power supply current Ibat, for example, on the basis of a value obtained by another sensor.

For example, in the case of a motor drive circuit for use in an electric power steering device or the like, energy balance is represented by the following equation (8):

[Math 1]

$$VR \cdot I_{bat} = K_t \cdot I_q \cdot \omega + R\frac{3}{2}(Id^2 + Iq^2) + Ploss \quad (8)$$

In the above equation (8), VR represents a power supply voltage that is an inverter applied voltage to be applied to the inverter, Ibat represents a power supply current that is a battery current flowing to the motor from the battery via the inverter, Kt represents a torque constant of the motor, Iq represents a q-axis current, Id represents a d-axis current, R represents a resistance value per phase of the motor, and Ploss represents a power loss due to iron loss, friction, or the like.

The right side of the above equation (8) corresponds to consumed power, so that the power supply current Ibat can be estimated by dividing the right side of the above equation (8) by the power supply voltage VR.

(2) The voltage detecting means configured to detect the power supply voltage VR is not limited to the voltage sensor 35. The voltage detecting means may estimate the power supply voltage VR, for example, on the basis of a value obtained by another sensor.

Reference will be made to FIG. 4. Assume the case where the power supply current Ibat is limited so that, as the power supply voltage VR, for example, an input voltage Vi (i.e., an applied voltage between a position of the contact resistance Rc3 and a position of the contact resistance Rc4) to be input to an electric power steering device is equal to or more than the lower limit voltage VLo.

In this case, the sum Rs of the resistance values is defined as a sum (Rb+Rc1+Rc2+Rh1+Rh2) of the internal resistance Rb of the battery 14, the contact resistances Rc1 and Rc2 of the connectors connecting the battery 14 and a harness, and harness resistances Rh1 and Rh2.

The input voltage Vi can be estimated by the following method, other than being directly detected by the sensor.

When an applied voltage (here referred to as "applied voltage Va") of the motor drive circuit 34 is known, a sum Ro of the resistances present between a position where the input voltage Vi to be estimated as the power supply voltage VR is generated and a position where the applied voltage Va is generated is a sum (Ro=(Rc3+Rc4+Rdc)) of the contact resistances Rc3 and Rc4 connecting the harness and the electric power steering device and circuit resistance Rdc in the electric power steering device.

Accordingly, detecting or estimating the power supply current Ibat enables the input voltage Vi to be estimated by the following equation (9):

$$Vin = Va + Ro \times Ibat \qquad (9)$$

Conversely, when the input voltage Vi to be input to the electric power steering device is known and the applied voltage Va of the motor drive circuit 34 is estimated as the power supply voltage VR, the applied voltage Va can be estimated by the following equation (10):

$$Va = Vin - Ro \times Ibat \qquad (10)$$

In this way, a voltage at any point in the power supply circuit is estimated as the power supply voltage VR by the power supply current Ibat and the resistance value present between the position where voltage can be detected by the sensor or the like and the position where the voltage to be estimated, whereby with use of the estimated value thereof, the power supply current Ibat can be limited so that the voltage at the any point becomes equal to or more than the power supply voltage VLo.

All examples and conditional terms given herein are intended for teaching purposes to help the readers understand the present invention and the concepts provided by the inventor for the advancement of technology. The present invention should be interpreted without being limited to the examples and conditions specifically described above and to the structures of such examples in this specification, which are related to showing superiority and inferiority of the present invention. While some embodiments of the present invention have been described in detail, it should be understood that various changes, substitutions, and modifications can be made thereto without departing from the spirit and scope of the present invention.

REFERENCE SIGNS LIST

1: Steering wheel
2: Steering shaft
3: Reduction gear
4A, 4B: Universal joint
5: Pinion rack mechanism
6: Tie rod
10: Torque sensor
11: Ignition key
12: Vehicle speed sensor
14: Battery
20: Motor
30: Control unit
31: Basic current command value calculation unit
32: Motor control unit
33: Current limit unit
34: Motor drive circuit
35: Voltage sensor
36: Current sensor
40: Subtractor
41: Current limit value calculation unit
42: Power supply current limit unit
43: Change rate limit value calculation unit
44: Power supply current change rate limit unit
45: Differentiator
60, 61: Low pass filter
62, 63, 64: Rate limiter
65: Resistance value estimation unit

The invention claimed is:

1. A power supply current control device comprising:
a voltage detecting unit configured to detect a power supply voltage applied from a power supply circuit;
a current detecting unit configured to detect a power supply current supplied from the power supply circuit;
a current limit value calculation unit configured to calculate a current limit value on a basis of a difference between the power supply voltage detected by the voltage detecting unit and a predetermined set voltage, the power supply current detected by the current detecting unit, and a resistance model representing a resistance component of the power supply circuit;
a power supply current limit unit configured to limit a magnitude of the power supply current on a basis of the current limit value;
a change rate limit value calculation unit configured to calculate a change rate limit value on a basis of the difference and a change speed of the power supply voltage; and
a power supply current change rate limit unit configured to limit a change rate of the power supply current on a basis of the change rate limit value.

2. The power supply current control device according to claim 1, wherein the change rate limit value calculation unit sets the change rate limit value so that a change rate in an increasing direction of the power supply current is more limited as a decrease speed of the power supply voltage becomes larger.

3. The power supply current control device according to claim 1, comprising a differentiator configured to calculate a differential value of the power supply voltage detected by the voltage detecting unit, wherein the change rate limit value calculation unit calculates the change rate limit value on a basis of the difference and the differential value.

4. The power supply current control device according to claim 3, comprising a rate limiter configured to limit a change rate of the differential value calculated by the differentiator or a rate limiter configured to limit a change rate of a variable for referring to the differential value used to calculate the change rate limit value.

5. The power supply current control device according to claim 1, comprising a resistance value estimation unit configured to calculate an estimated value of the resistance component of the power supply circuit, wherein the current limit value calculation unit calculates the current limit value on a basis of the difference, the power supply current detected by the current detecting unit, and the estimated value.

6. The power supply current control device according to claim 1, comprising a resistance value estimation unit configured to calculate an estimated value of the resistance component of the power supply circuit, wherein the change rate limit value calculation unit calculates the change rate limit value on a basis of the difference and a difference or a ratio between the estimated value and a resistance value of the resistance model.

7. The power supply current control device according to claim 1, comprising at least one of a filter configured to smooth a detected value of the power supply voltage by the voltage detecting unit and a filter configured to smooth a detected value of the power supply current by the current detecting unit.

8. The power supply current control device according to claim 1, comprising at least one of a rate limiter configured to limit a change rate of the current limit value calculated by the current limit value calculation unit and a rate limiter configured to limit a change rate of the change rate limit value calculated by the change rate limit value calculation unit.

9. An electric actuator product comprising:
the power supply current control device according to claim 1; and
a motor configured to be driven by the power supply current controlled by the power supply current control device.

10. An electric power steering device configured to apply a steering assistance force to a steering system of a vehicle by the electric actuator product according to claim 9.

* * * * *